March 9, 1954
M. ROY
2,671,312
DEVICE FOR FEEDING REAGENTS TO THE
MIXING CHAMBERS OF ROCKETS
Filed Nov. 14, 1949
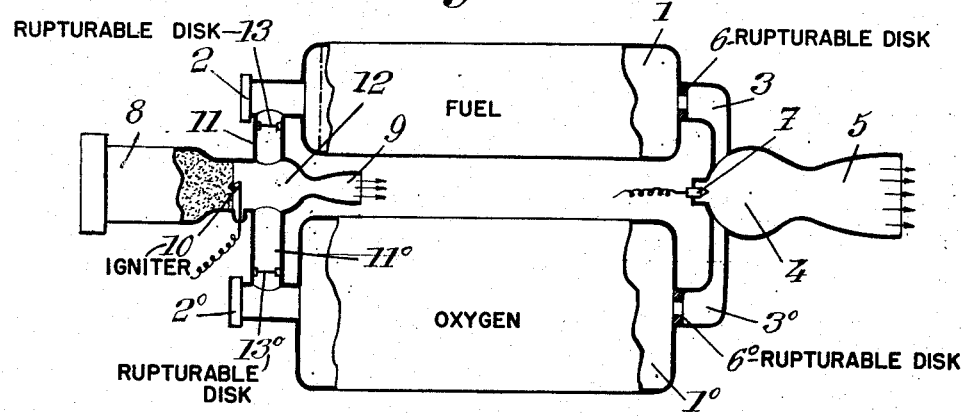
INVENTOR
MAURICE ROY
BY
Robert B. [illegible]
ATTORNEY

Patented Mar. 9, 1954

2,671,312

UNITED STATES PATENT OFFICE 2,671,312

DEVICE FOR FEEDING REAGENTS TO THE MIXING CHAMBERS OF ROCKETS

Maurice Roy, Paris, France, assignor to Office National d'Etudes et de Recherches Aéronautiques, dit: O. N. E. R. A., Paris, France, a society of France Application November 14, 1949, Serial No. 126,939

Claims priority, application France November 20, 1948

2 Claims. (Cl. 60—35.6)

My invention relates to the category of devices for generating gas having a high kinetic energy which makes use, for producing this gas, of reagents (for instance a fuel and an oxidant) at least one of which is of the fluent form, i. e. constituted by a liquid, pasty, powdery or other material having a certain fluidity. It is more particularly, although not exclusively, concerned with liquid fuel rockets, i. e. rockets making use of liquid reagents fed under pressure into a mixing chamber where a chemical reaction takes place to generate gas at high pressure which is discharged at high speed through one or several jet nozzles.

Up to the present time, the feeding of the reagents to the mixing chamber was obtained either by means of pumps driven by a suitable motor provided for this purpose or by the pressure produced in the reagent tank by an inert gas stored therein or by the combustion of an explosive charge in a space in communication with this tank.

These solutions involve serious drawbacks (considerable weight added to that of the system in the case of pumps, difficulty to control the rate of flow of reagent in the other case) which make it difficult, if not impossible, to use them on some kinds of machines, and in particular on aerial rockets.

The object of the present invention is to obviate these drawbacks.

For this purpose, according to my invention, the pressure which is to cause one (or more) of the reagents to flow into the mixing chamber is supplied by a portion of the gas delivered by an auxiliary rocket which cooperates with the main device to produce the stream of high kinetic energy gas.

Preferred embodiments of my invention will be hereinafter described with reference to the accompanying drawing, given merely by way of example and in which:

Fig. 1 diagrammatically shows a liquid fuel rocket made according to my invention;

Figs. 2 and 3 are, respectively, a longitudinal section on the line II—II of Fig. 3 and a cross section on the line III—III of Fig. 2 of a particular embodiment of a rocket according to my invention;

Figs. 4 and 5 are larger scale views illustrating details of the rocket of Figs. 2 and 3.

A rocket according to my invention, as illustrated by the drawings, includes two tanks 1 and 1⁰ containing, respectively, a liquid fuel, such for instance as liquid hydrogen, and a liquid oxidant, such for instance as liquid oxygen, these two tanks being provided with filling plugs 2 and 2⁰ respectively.

These tanks are connected, through conduits 3 and 3⁰, respectively, with a mixing chamber 4 the outlet of which is in communication with at least one jet nozzle 5. Stopping means constituted by bursting discs or plugs 6 and 6⁰, interposed between said respective tanks 1 and 1⁰ and mixing chamber 4, are adapted to yield under the action of a given pressure in said tanks.

The mixing and combustion chamber is further provided with igniting means 7, for instance a spark plug, when the liquids that are fed to chamber 4 are not capable of igniting simultaneously upon being mixed.

Now, according to my invention, the pressure feeding the matters in tanks 1 and 1⁰ to chamber 4 is ensured by means of gas collected from the stream supplied by an auxiliary rocket 8 which cooperates with the device, the reaction energy of the gas stream supplied by said auxiliary rocket, after a portion thereof has thus been withdrawn for the purpose of feeding the liquids in tanks 1 and 1⁰ to chamber 4, being used for propulsion. In the embodiment of Fig. 1, the propulsive effect of the auxiliary rocket is exerted independently through a jet 9. In the embodiment of Figs. 2 and 3, the gas stream from the auxiliary rocket passes through mixing chamber 4 and nozzle 5.

Of course, in this last mentioned case, the explosive charge of auxiliary rocket 8 is chosen of such a nature that the gas it supplies produces no detrimental chemical reaction with the matters present in chamber 4.

For instance, auxiliary rocket 8 may be loaded with powder and be fitted with a suitable igniting device 10.

The combustion chamber 12 of this auxiliary rocket is connected through conduits 11 and 11⁰ with tanks 1 and 1⁰, preferably with the interposition of bursting discs or plugs 13 and 13⁰ forming stopping means adapted to yield under the effect of a predetermined pressure in chamber 12.

The device works in the following manner:

As soon as the auxiliary rocket 8 has been ignited, the combustion gases from chamber 12 burst discs 13, 13⁰ and exert the desired pressure on the liquids in tanks 1 and 1⁰. These liquids are thus driven into chamber 4, after bursting discs 6 and 6⁰.

It will be readily understood that the working of auxiliary rocket 8 is but little influenced (and any way in a manner which can be calculated and experimentally checked up) by the feed of liquid reagents from tanks 1 and 1⁰ to mixing chamber 4.

This auxiliary rocket will be designed to achieve a law of variation of the pressure in chamber 12 such that this pressure can feed the liquids from tanks 1 and 1⁰ to mixing chamber 4, account being taken of the pressure drops that occur on the upstream side of this chamber.

Advantageously, to control the pressure in chamber 12, when rocket 8 is loaded with powder burning gradually on its free surface (which may be, for instance, flat, conical or cylindrical), this rocket is shaped to obtain a given rate of variation of the area of said surface of combustion as the powder is burning. In particular, in the case illustrated by the drawing, when the rocket is loaded with powder packed in a homogeneous manner, this predetermined variation will be obtained by suitably choosing the shape of the axial section of said rocket.

In the example shown, the rear end of the rocket tube is cylindrical and connected with the cylindrical main portion thereof (of larger diameter) by a conical portion.

Figs. 2 to 5 show another embodiment of my invention, with which the volume occupied by the device is smaller.

In this case, tanks 1 and 1⁰ are formed between two coaxial walls $a$ and $b$ in the form of bodies of revolution, suitably braced and provided with radial partitions $c$ for limiting chambers 1 and 1⁰. The inner wall $b$ constitutes the envelope of the auxiliary rocket and can therefore be made relatively thin because it is subjected only to a difference of pressures.

The distribution of the liquids from tanks 1 and 1⁰ into mixing chamber 4 is made symmetrical by giving conduits 3 and 3⁰ the form of annular chambers surrounding the wall of chamber 4, which is provided with suitable holes for this purpose.

The wall which separates tank 1⁰ from chamber 3⁰ is provided with a bursting disc 6⁰. The wall which separates tank 1 from chamber 3 is provided with a bursting disc 6.

The combustion chamber 12 of the auxiliary rocket opens into the mixing chamber 4 of the main rocket.

On the other hand, this combustion chamber 12 communicates with tanks 1 and 1⁰ through branch conduits 11 and 11⁰ (provided with bursting discs 13 and 13⁰) and tubes 14 and 14⁰ which extend to a short distance from the front ends of said tanks. Thus bubbling of the gases through the liquids present in tanks 1 and 1⁰ is avoided and these liquids are caused to flow correctly into chamber 4, without forming emulsions.

Furthermore, means are provided for temporarily connecting the rear ends of tubes 14 and 14⁰ directly with the inside of tanks 1 and 1⁰. This connection, which is established only during the filling of said tanks, prevents air from accumulating in said tubes in the course of this operation.

These means are, for instance, constituted as illustrated by Fig. 4. The end of each tube is rotatable with a snug fit on the end of the corresponding conduit 11 and is provided with holes 14a adapted to register with corresponding holes 11a provided in said end of conduit 11 for a given angular position of tube 14 with respect to conduit 11. The necessary rotation to be imparted to tube 14 to bring the holes 14a thereof into coincidence with the holes 11a of conduit 11 is imparted by means of a tool introduced into the front end of said tube 14 through the filling orifice 2 of the corresponding tank.

Holes 14a and 11a are set in coincidence when the tank is to be filled. After the filling operation, they are rotated with respect to one another so as to cut off any direct communication between the rear end of tube 14 and the inside of tank 1.

The pressure of the gases from chamber 12 acts, in the above described examples, directly on the free surface of the liquids in tanks 1 and 1⁰. This does not constitute a necessary arrangement in a device according to my invention, as a movable partition might be interposed between the liquid and the gas, which could then be of any kind whatever, since there would no longer be any risk of a chemical reaction taking place between these fluids.

Concerning the bursting discs or plugs 6, 6⁰, 13 and 13⁰ which constitute the yielding stopping means, they are preferably made of a type illustrated by Fig. 5. With this arrangement, the portion of the pipe which is to be fitted with such a plug is made of two portions 15a and 15b assembled together by a ring 16 which screws on one of these portions and bears against a shoulder carried by the other.

A diaphragm 13 is inserted between the adjacent edges of said portions, preferably with the interposition of a packing ring 18. The portion of this diaphragm extending across the inside of the tube is provided with a circular groove 13a of a depth such that the central portion of the diaphragm is cut off by the differential pressure acting thereon when this pressure reaches a given value.

A rocket made according to my invention, as above described, is simple and compact (thus reducing the drag). The feeding of the liquid reagents from the tanks to the mixing chamber is continuous and can take place according to a desired law, whereas the feeding means supply supplementary energy to propel the rocket. Furthermore, the mixing chamber is efficiently cooled by the liquid reagents.

My invention is not limited to its use in connection with aerial rockets. It could be applied to the propulsion of surface crafts, submarines or land vehicles and even to the operation of gas generators other than rockets, such for instance as generators for supplying gas to a turbine or the like.

Of course, the various elements of the combination above described (auxiliary rocket, tanks, nozzles, etc.) are not necessarily located close to each other as above described. They are located in the most advantageous manner for every particular case.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A rocket which comprises, in combination, a mixing chamber, at least two tanks each adapted to communicate at one end thereof with said chamber, said tanks containing respectively liquid reagents capable of reacting with each other to generate gas at high pressure, an auxiliary solid propellant rocket mounted to add its jet energy to that of the first mentioned rocket, said auxiliary rocket including a combustion chamber having its outlet opening rearwardly into said mixing chamber, conduit means leading from said combustion chamber outlet to the other ends of said tanks to convey a portion of the gases in said combustion chamber into said tanks to exert therein a pressure capable of feeding said liquid reagents to said mixing chamber, and manually operable means for connecting the portions of these conduit means located close to said combustion chamber outlet directly with the first mentioned ends of said tanks.

2. A rocket according to claim 1, in which said conduit means include each two tube elements having their respective ends fitted in each other for rotary movement with respect to each other about their common axis, at the place where the conduit means are to be directly connected with the first mentioned ends of said tanks, said ends of the tube elements being provided with respective holes arranged to register for a given angular position of said tubes on said conduit means.

MAURICE ROY.

References Cited in the file of this patent

UNITED STATES PATENTS

| Number | Name | Date |
|---|---|---|
| 1,959,822 | Greve | May 22, 1934 |
| 2,095,828 | Nerad | Oct. 12, 1937 |
| 2,261,035 | Miller | Oct. 28, 1941 |
| 2,402,826 | Lubbock | June 25, 1946 |
| 2,408,111 | Truax et al. | Sept. 24, 1946 |
| 2,510,572 | Goddard | June 6, 1950 |
| 2,523,656 | Goddard | Sept. 26, 1950 |

OTHER REFERENCES

"Astronautics," Journal of the American Rocket Society, No. 34, June 1936, pages 9-12.

"Tank Pressure from Combustion Chamber," Journal of the American Rocket Society, No. 75, September 1948, pages 118-120.